(12) United States Patent
Yu

(10) Patent No.: US 9,998,334 B1
(45) Date of Patent: Jun. 12, 2018

(54) DETERMINING A COMMUNICATION LANGUAGE FOR INTERNET OF THINGS DEVICES

(71) Applicant: Chengfu Yu, Irvine, CA (US)

(72) Inventor: Chengfu Yu, Irvine, CA (US)

(*) Notice: Subject to any disclaimer, the term of this patent is extended or adjusted under 35 U.S.C. 154(b) by 0 days. days.

(21) Appl. No.: 15/680,146

(22) Filed: Aug. 17, 2017

(51) Int. Cl.
| | |
|---|---|
| *H04L 29/06* | (2006.01) |
| *H04L 12/24* | (2006.01) |
| *H04L 29/08* | (2006.01) |
| *H04W 4/00* | (2018.01) |

(52) U.S. Cl.
CPC ...... *H04L 41/0876* (2013.01); *H04L 63/0876* (2013.01); *H04L 63/10* (2013.01); *H04L 67/125* (2013.01); *H04W 4/005* (2013.01); *H04W 4/70* (2018.02)

(58) Field of Classification Search
CPC ............... H04L 41/0876; H04L 67/125; H04L 63/0876; H04L 63/10; H04W 4/005
See application file for complete search history.

(56) References Cited

U.S. PATENT DOCUMENTS

| | | | | | |
|---|---|---|---|---|---|
| 5,428,772 | A | * | 6/1995 | Merz | ...... G06F 9/4448 |
| 5,715,224 | A | * | 2/1998 | Fujinami | ...... G10H 1/363 |
| | | | | | 369/47.16 |
| 5,765,142 | A | * | 6/1998 | Allred | ...... G06Q 20/20 |
| | | | | | 705/16 |
| 6,069,939 | A | * | 5/2000 | Fung | ...... H04M 3/4228 |
| | | | | | 379/67.1 |
| 6,154,673 | A | * | 11/2000 | Morgan | ...... A61N 1/39 |
| | | | | | 607/5 |
| 6,385,586 | B1 | * | 5/2002 | Dietz | ...... G06F 17/289 |
| | | | | | 704/251 |
| 7,987,195 | B1 | * | 7/2011 | Li | ...... G06F 17/30017 |
| | | | | | 707/765 |
| 8,694,511 | B1 | * | 4/2014 | Corduneanu | ...... G06F 17/30867 |
| | | | | | 707/723 |
| 8,776,196 | B1 | * | 7/2014 | Oliver | ...... H04L 63/1483 |
| | | | | | 726/11 |
| 8,917,905 | B1 | * | 12/2014 | Dill | ...... A63J 1/02 |
| | | | | | 362/145 |
| 8,959,093 | B1 | * | 2/2015 | Nerurkar | ...... G06F 17/30867 |
| | | | | | 707/706 |
| 9,380,325 | B1 | * | 6/2016 | Cormie | ...... H04N 21/23424 |
| 9,699,128 | B1 | * | 7/2017 | Zhang | ...... G06F 3/0482 |
| 2002/0046131 | A1 | * | 4/2002 | Boone | ...... G06Q 30/06 |
| | | | | | 705/27.1 |

(Continued)

*Primary Examiner* — John B King
(74) *Attorney, Agent, or Firm* — Arman Khosraviani

(57) ABSTRACT

A device is disclosed. The device includes a network module; where the network module is capable of communicatively coupling to one or more network access points. The device further includes one or more processors, a machine-readable medium comprising instructions stored therein, which, when executed by the one or more processors cause the one or more processors to perform operations including: receiving one or more broadcast signals from the one or more network access points, wherein the broadcast signal comprises a network discovery beacon frame, extracting an information from the beacon frame of each broadcast signal, determining a language of communication based on the extracted information; and assigning the language of communication as a first option of language of communication of the device.

21 Claims, 7 Drawing Sheets

(56) References Cited

U.S. PATENT DOCUMENTS

| | | | |
|---|---|---|---|
| 2002/0120459 A1* | 8/2002 | Dick | G06Q 10/06316 705/7.26 |
| 2002/0129021 A1* | 9/2002 | Brown | G06Q 10/06 |
| 2006/0101137 A1* | 5/2006 | Suto | H04L 67/06 709/223 |
| 2007/0027696 A1* | 2/2007 | Burger | G06Q 20/382 705/64 |
| 2007/0226343 A1* | 9/2007 | Bishop | G06F 8/61 709/226 |
| 2008/0072305 A1* | 3/2008 | Casado | H04L 63/0492 726/11 |
| 2009/0088183 A1* | 4/2009 | Piersol | G01C 21/206 455/456.1 |
| 2009/0265163 A1* | 10/2009 | Li | G06Q 10/10 704/10 |
| 2010/0329232 A1* | 12/2010 | Tubb | E05B 39/00 370/345 |
| 2011/0047597 A1* | 2/2011 | Mahaffey | G06F 21/564 726/3 |
| 2012/0162013 A1* | 6/2012 | Piersol | G01S 5/0236 342/386 |
| 2013/0201215 A1* | 8/2013 | Martellaro | G09G 5/00 345/633 |
| 2013/0238332 A1* | 9/2013 | Chen | G10L 15/183 704/240 |
| 2013/0244614 A1* | 9/2013 | Santamaria | H04L 51/04 455/411 |
| 2013/0308494 A1* | 11/2013 | Shu | H04W 48/16 370/254 |
| 2013/0346077 A1* | 12/2013 | Mengibar | G10L 15/265 704/235 |
| 2014/0059220 A1* | 2/2014 | Kim | G01S 5/0009 709/224 |
| 2014/0351268 A1* | 11/2014 | Weskamp | G06F 17/217 707/748 |
| 2015/0248399 A1* | 9/2015 | Patil | G06F 3/167 704/8 |
| 2015/0309996 A1* | 10/2015 | Han | G06K 9/00442 704/2 |
| 2016/0358598 A1* | 12/2016 | Williams | G10L 15/04 |
| 2017/0085565 A1* | 3/2017 | Sheller | H04L 63/0876 |
| 2017/0134883 A1* | 5/2017 | Lekutai | H04W 4/008 |
| 2017/0250930 A1* | 8/2017 | Ben-Itzhak | H04L 51/02 |
| 2017/0291295 A1* | 10/2017 | Gupta | B25J 9/0081 |

* cited by examiner

DETERMINING A COMMUNICATION LANGUAGE FOR INTERNET OF THINGS DEVICES

CROSS-REFERENCE TO RELATED APPLICATIONS

The entire contents of the following applications are incorporated herein by reference: U.S. Nonprovisional patent application Ser. No. 15/386,670; filed on Dec. 21, 2016; and entitled AUTONOMOUS PAIRING OF INTERNET OF THINGS DEVICES. U.S. Nonprovisional patent application Ser. No. 15/454,446; filed on Mar. 9, 2017; and entitled DUAL VIDEO SIGNAL MONITORING AND MANAGEMENT OF A PERSONAL INTERNET PROTOCOL SURVEILLANCE CAMERA. Nonprovisional patent application Ser. No. 15/488,211 filed on Apr. 14, 2017; and entitled AN INTERACTIVE AUGMENTED-REALITY IoT DEVICES SYSTEMS AND METHODS. Nonprovisional patent application Ser. No. 15/490,826 filed on Apr. 18, 2017; and entitled GARAGE DOOR CONTROLLER AND MONITORING SYSTEM AND METHOD. Nonprovisional patent application Ser. No. 15/620,749 filed on Jun. 12, 2017; and entitled SMART REGISTER DEVICE AND METHOD. Nonprovisional patent application Ser. No. 15/625,601 filed on Jun. 16, 2017; and entitled SMART FAN AND VENTILLATION DEVICE AND METHOD. Nonprovisional patent application Ser. No. 15/649,316 filed on Jul. 14, 2017; and entitled AUTONOMOUS PAIRING OF INTERNET OF THINGS DEVICES UTILIZING BROADCAST PACKETS.

TECHNICAL FIELD

The present disclosure generally relates to internet of things (IoT) devices and in particular, for example, to determining a communication language for the IoT devices.

BACKGROUND

IoT devices have limited capabilities for data entry, advanced peripherals such as keyboards are not always available for IoT devices to utilize data entry. When powering up an IoT device for the first time a language of communication to aid a user in setting up the device is usually utilized. Classically the language of communication defaults to a language chosen or pre-programmed into the IoT device. However, sometimes the default communication language is a language not understood by the user (e.g., for geographical reasons). Also, given the globalization of today's market the same IoT device might be sold in different countries each with a different communication language and assigning a default language to each device based on where it will be sold is cumbersome. Accordingly, there is a need in the art for an efficient, transparent method of assigning the language of communication of IoT devices.

SUMMARY

The disclosed subject matter relates to a device that include a network module; where the network module is capable of communicatively coupling to one or more network access points. The device further includes one or more processors, a machine-readable medium comprising instructions stored therein, which, when executed by the one or more processors cause the one or more processors to perform operations including: receiving one or more broadcast signals from the one or more network access points, wherein the broadcast signal comprises a network discovery beacon frame, extracting an information from the beacon frame of each broadcast signal, determining a language of communication based on the extracted information; and assigning the language of communication as a first option of language of communication of the device.

The disclosed subject matter also relates to a method including: receiving one or more broadcast signals from one or more network access points, wherein the broadcast signal comprises a network discovery beacon frame; extracting an information from the beacon frame of each broadcast signal; determining a language of communication based on the extracted information; and assigning the language of communication as a first option of language of communication of a device.

The disclosed subject matter further relates to a non-transitory machine-readable medium comprising instructions stored therein, which, when executed by one or more processors of a processing system cause the one or more processors to perform operations including: receiving one or more broadcast signals from one or more network access points, wherein the broadcast signal comprises a network discovery beacon frame; extracting an information from the beacon frame of each broadcast signal; determining a language of communication based on the extracted information; and assigning the language of communication as a first option of language of communication of a device.

It is understood that other configurations of the subject technology will become readily apparent to those skilled in the art from the following detailed description, wherein various configurations of the subject technology are shown and described by way of illustration. As will be realized, the subject technology of other different configurations and its several details are capable of modifications in various other respects, all without departing from the subject technology. Accordingly, the drawings and the detailed description are to be regarded as illustrative in nature and not restrictive.

BRIEF DESCRIPTION OF DRAWINGS

Certain features of the present disclosure are set forth in the appended claims. However, for purpose of explanation, several implementations of the present disclosure are set forth in the following figures.

Figure 1:
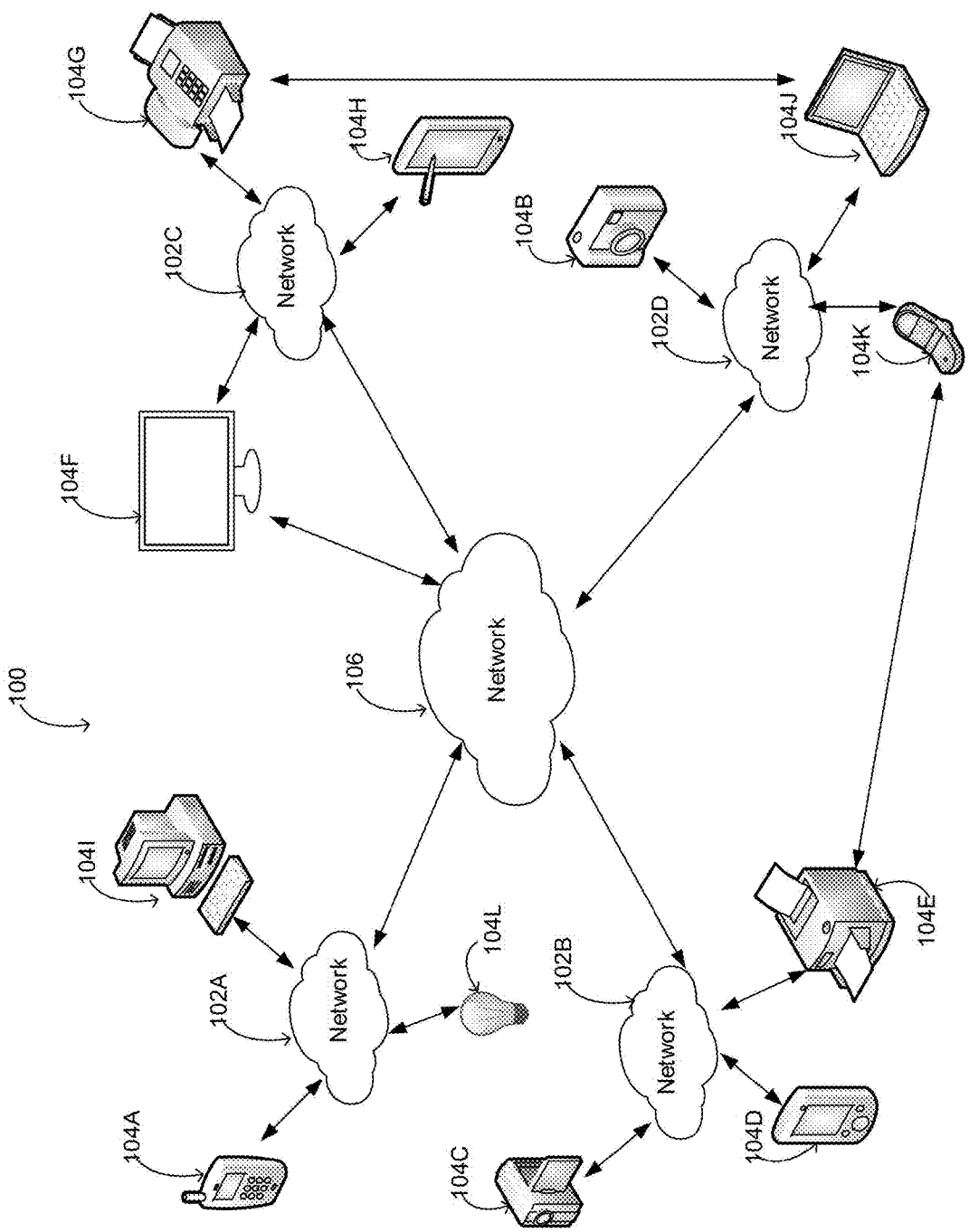
FIG. 1 illustrates an exemplary network environment for implementing an IoT system in accordance with one or more embodiments of the present disclosure.

Embodiments of the present disclosure and their advantages are best understood by referring to the detailed description that follows. It should be appreciated that like-reference-numerals are used to identify like-elements illustrated in one or more of the figures.

DETAILED DESCRIPTION

The detailed description includes specific details for the purpose of providing a thorough understanding of the present disclosure. However, the present disclosure is not limited to the specific details set forth herein and may be practiced without these specific details. In some instances, structures and components are shown in block diagram form to avoid obscuring the concept of the present disclosure.

As noted above, IoT devices have limited capabilities for data entry, advanced peripherals such as keyboards are not always available for IoT devices to utilize data entry. Voice messages with a default language of a communication are utilized to facilitate communication with a user, but given the global market of today, assigning different communication languages to IoT devices based on their geographical location of operation is cumbersome. According to aspects of the technology, an IoT device receives one or more broadcast signals from one or more nearby network access points. The broadcast signal may include a network discovery beacon frame to aid in discovering the network access point associated with the beacon frame. The IoT device extracts an information from the beacon frame of each received broadcast signal and determines a language of communication based on the extracted information. The IoT device assigns the language of communication as a first option of language of communication.

In one or more implementations, the information is country information within the beacon frame where if the information contains no country information; the language of communication is assigned to a default predetermined language of communication. In some aspects, determining the first option of language of communication includes meeting a first calculated threshold, wherein failure to meet the first calculated threshold and meeting a second calculated threshold results in assigning a second option of language of communication to the IoT device.

In one or more implementations, failure to meet the first calculated threshold, failure to meet the second calculated threshold and meeting a third calculated threshold results in assigning a third option of language of communication. Failure to respond to a communication within a predetermined period of time utilizing the first option of language of communication results in assigning the second option of language of communication as the language of communication of the IoT device. In another aspect, failure to respond to a communication within a predetermined period of time utilizing the second option of language of communication results in assigning the third option of language of communication as the language of communication of the IoT device. The first calculated threshold, the second calculated threshold and the third calculated threshold are determined from the information and the number of one or more access points.

In one or more implementations, failure to respond to a communication within a predetermined period of time of utilizing the third option of language of communication results in assigning a default predetermined language of communication as the language of communication of the IoT device. According to aspects of the subject technology, the first option of language of communication, the second option of language of communication or the third option of language of communication is a first official language of communication associated with the country information of a corresponding access point. Furthermore, failure to respond to a communication within a predetermined period of time of utilizing the first official language of communication results in assigning the first option of language of communication a second official language of communication associated with the country information.

FIG. 1 illustrates an exemplary network environment 100 for implementing an IoT system in accordance with one or more embodiments of the present disclosure. Not all of the depicted components may be required. However, one or more implementations may require additional components, fewer components or different components not shown in network environment 100. Thus, any variations in network environment 100 may be implemented without departing from the scope of the present disclosure.

Network environment 100 may be a number of networks such as an IoT network, a private network, the internet, any other network, or combinations thereof. The network environment 100 includes networks 102A, 102B, 102C, 102D (hereafter referred to as 102A-102D) and 106. Network environment 100 includes a number of electronic devices 104A, 104B, 104C, 104D, 104E, 104F, 104G, 104H, 104I, 104J, 104K, 104L (hereafter referred to as 104A-104L). One or more of the devices 104A-104L, such as device 104A, may be a device capable of communicating with one or more of devices 104A-104L (e.g., via wired or wireless communication). In some aspects, the devices 104A-104L may include, may be embedded in, or may be coupled to a portable communication device, such as a mobile phone, a laptop, a tablet or any other communication device. The devices 104A-104L may be communicably coupled to one or more of the networks 102A-102D, 106 and/or to one or more other devices of the devices 104A-104L. As depicted in FIG. 1 examples of devices 104A-104L may include a computer, a desktop, a laptop, a tablet, a fax machine, a printer, light bulb and so forth.

One or more of the networks 102A-102D and 106 include one or more wired or wireless devices that facilitate devices communication, such as router devices, switch devices, relay devices, etc., and/or include one or more servers. One or more of the networks 102A-102D and 106, such as network 106 may be, or may include, a cloud of computers. One or more of the networks 102A-102D and 106 may be a local area network that communicatively couples one or more of the devices 104A-104L. In one or more implementations, one or more of networks 102A-102D and 106 may be referred to as an IoT network and/or a machine-to-machine (M2M) network.

One or more of the devices 104A-104L may be referred to as an IoT device and/or an M2M device and may include human-machine interface (HMI) applications and machine-interface applications. There may be multiple paths between one or more of the devices 104A-104L and/or one or more of the networks 102A-102D and 106. In one or more implementations, devices 104A-104L may utilize a peer-to-peer (P2P) network to establish a communication channel between the devices. One or more of the devices 104A-104L may include or may be a sensor that measures a physical quantity from surrounding environment and convert physical quantities into a signal. Examples of sensors include, by way of illustration only and not by way of limitation, temperature sensors, video cameras, audio recorders, motion sensors, humidity sensors, smoke detectors and other sensors.

In one or more implementations, devices 104A-104L may include one or more of active devices, passive devices and/or implemented wholly or partially as system on chip devices. Devices 104A-104L may include a transmitter, a receiver, a Global Positioning System (GPS), a Bluetooth (BT)/BLE transceiver and/or a WiFi™ transceiver. In one or more implementations, networks 102A-102D and 106 may include one or more network access points, such as a wireless access point (WAP) where the WAP is capable of transmitting a user datagram packet (UDP), where networks 102A-102D and 106 do not need to have a pre-established network connection with receiving devices to transmit the UDP packet. In some aspects, the WAP is also capable of transmitting beacon signals to aid nearby devices (e.g., devices 104A-104L) in detecting the WAP. In some aspects of the technology, one or more of the devices 104A-104L are configured to connect to a wireless access point such as 102A-102D to join a local area network such as local area network utilizing Danale Inc. SMARTADD™ technology.

Figure 2A:
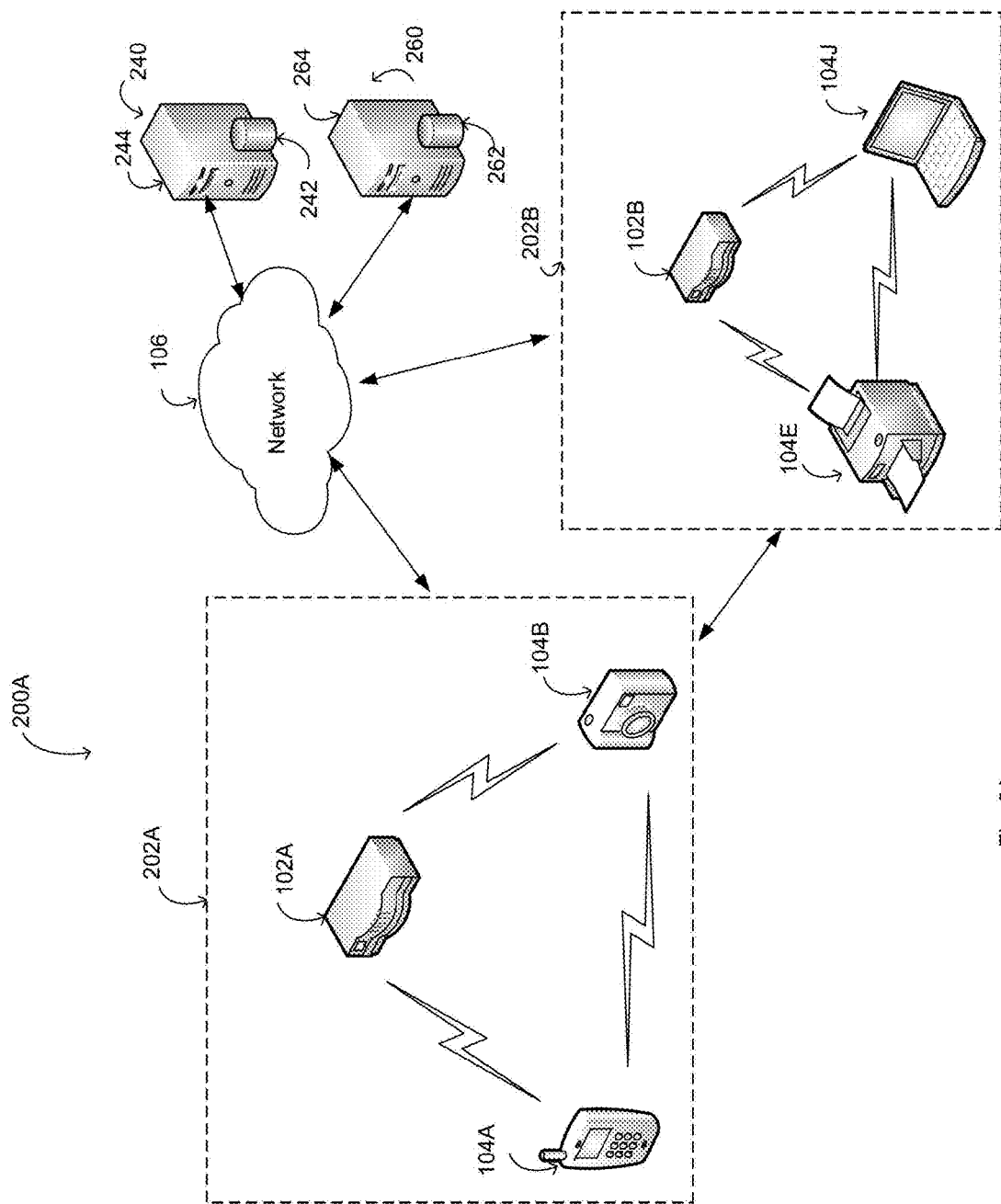
FIG. 2A illustrates an exemplary network environment to identify a communication language of interest in accordance with one or more embodiments of the present disclosure.

FIG. 2A illustrates an exemplary network environment 200A to identify an access point of interest 102A in accordance with one or more embodiments of the present disclosure. Network environment 200A includes wireless local area network 202A, wireless local area network 202B, network 106, and servers 240 and 260. For example, by way of illustration only and not by way of limitation, wireless local area network area 202A may include IoT devices 104A and 104B and wireless access point 102B and wireless local area network area 202B may include IoT devices 104E and 104J and wireless access point 102B. Servers 240 and 260 may include computing devices 244 and 264 and computer-readable storage devices 242 and 262. The network environment 200A includes a wireless access point 102A that facilitates communication between IoT devices 104A and 104B, and wireless access point 102B that facilitates communication between IoT devices 104E and 104J. Nevertheless, devices within local area network 202A such as IoT device 104B might view both local area network 202A and 202B prior to being associated with a specific local area network such as 202A.

In some aspects, network environment 200A may be a distributed client/server system that spans one or more networks such as, for example, network 106. Network 106 can be a large computer network such as, for example, wide area network (WAN), the Internet, a cellular network, or a combination thereof connecting any number of mobile clients, fixed clients, and servers. Further, the network 106 can include, but is not limited to, any of the following network topologies, including a bus network, a star network, a ring network, a mesh network, a star-bus network, tree or hierarchical network, and the like. In some aspects, communication between IoT devices 104A-104B and servers 240 and 260 can occur via a virtual private network (VPN), Secure Shell (SSH) tunnel, or other secure network connection. In some aspects, network 106 may further include a corporate network (e.g., intranet) and one or more wireless access points.

Wireless local area networks 202A-202B can include, but is not limited to, a computer network that covers a limited geographic area (e.g., a home, school, computer laboratory, or office building) using a wireless distribution method (e.g., spread-spectrum or OFDM). Wireless client devices 104A-104B may associate with wireless access point 102A to access wireless local area network 106 using WiFi™ standards (e.g., IEEE 802.11). Wireless access point 102A may include other network components in addition to a wireless access point. For example, wireless access point 102A may include a router, switch, bridge, broadband modem etc. According to aspects of the subject technology, wireless access point 102A is a wireless router that provides both access point functionality and network routing functionality.

Server 240 may be any system or device having a processor, a memory, and communications capability for providing content and/or services to the IoT devices 104A-104B, 104E and 104J. In some example aspects, the server 240 can include a single computing device 244, for example, or can include more than one computing device working together to perform the actions of a server (e.g., cloud computing, server farm). Further, the server 240 can represent various forms of servers including, but not limited to, a web server, an application server, a proxy server, etc.

Similarly, server 260 may be any system or device having a processor, a memory, and communications capability for providing content and/or services to the IoT devices 104A-104B, 104E and 104J. In some example aspects, the server 260 can be a single computing device 264, for example, or can include more than one computing device working together to perform the actions of a server (e.g., cloud computing, server farm). Further, the server 260 can represent various forms of servers including, but not limited to, a web server, an application server, a proxy server, etc.

A cloud-based service may include services provided by one or more servers, such as server 240 and server 260, via one or more networks, such as network 106. Cloud-based services may require authentication of user account credentials for access via a cloud-based application, such as a web-based personal portal, a web-based email application, etc. A cloud-based service has access to computer-readable storage devices 242 and 262 and may store information or data of a user once the user account credentials are authenticated. The stored data or information is also available to the user for future access and possible manipulation via other applications that are employed by the user.

Each of IoT devices 104A-104B, 104E and 104J, may represent various forms of processing devices. By way of illustration only and not by way of limitation, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices.

As depicted in FIG. 2A, IoT devices 104A-104B, WiFi™ enabled devices, connect and communicate with the wireless access point 102A using wireless links. These wireless links may be established and managed using various protocols including the IEEE 802.11 protocols. The IoT devices 104A-104B may communicate wirelessly through a communication interface (not shown), which may include digital signal processing circuitry. In addition to the IEEE 802.11 protocols, the communication interface may provide for communications under other modes or protocols such as, for example, Global System for Mobile communication (GSM) voice calls, Short Message Service (SMS), Enhanced Messaging Service (EMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, peer-to-peer (P2P) network, or General Packet Radio System (GPRS), among others.

According to aspects of the technology, IoT device 104B is a new device that requires an initial setup process to join wireless local wireless network 202A. Due to limited data entry peripherals, voice messages are communicated to a user, aiding the user during the initial setup process of the IoT device 104B. Upon powering up the IoT device 104B, beacon signals from nearby wireless local area networks (e.g., 202A-202B) are received by IoT device 104B. According to aspects of the subject technology, information contained within the beacon signal is utilized to determine a communication language for IoT device 104B to use in communicating with the user the voice messages.

Figure 2B:
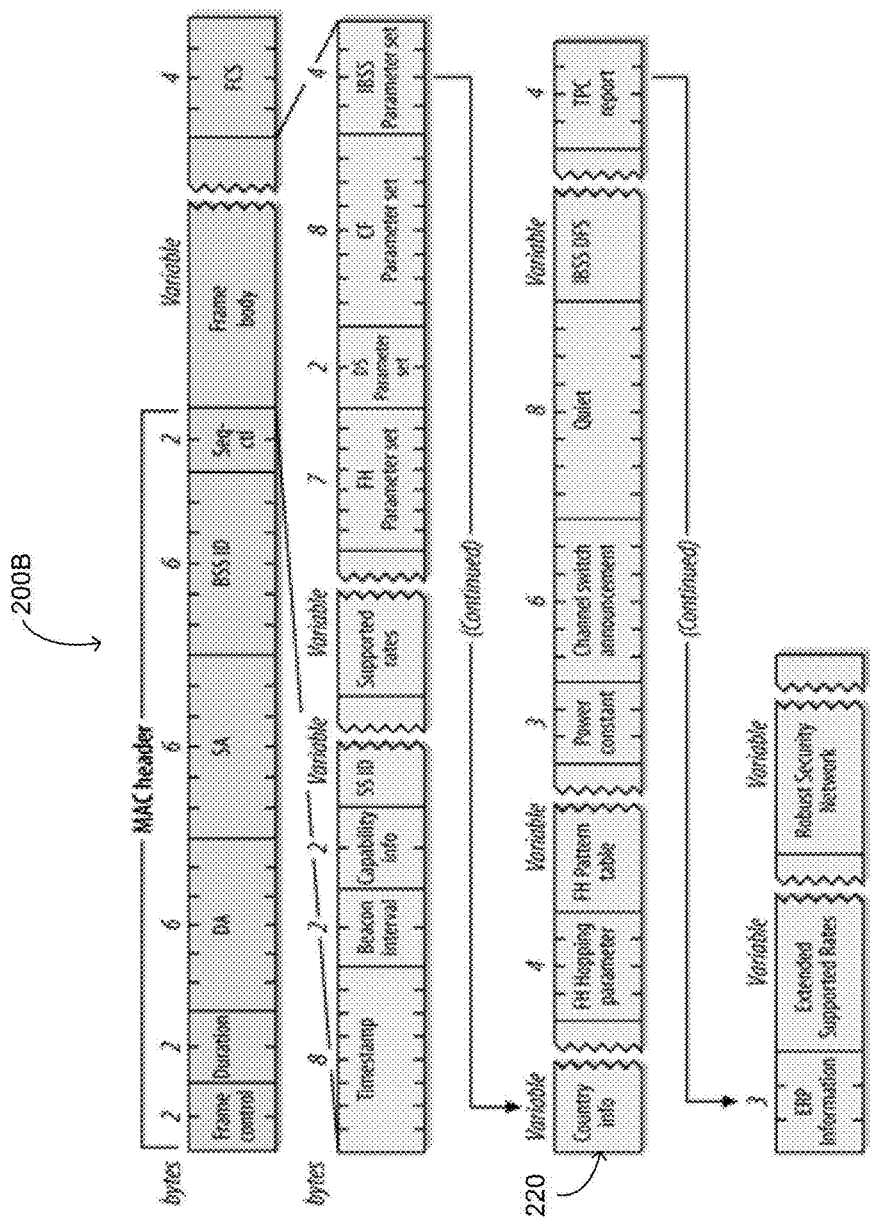
FIG. 2B illustrates an exemplary beacon frame in accordance with one or more embodiments of the present disclosure.

FIG. 2B illustrates an exemplary beacon frame 200B, in accordance with one or more embodiments of the present disclosure. A beacon frame 200B, one of the management frames in IEEE 802.11 standard, contains information about the network. Beacon frames are transmitted periodically to announce the presence of a wireless LAN. Beacon frames are transmitted by the access point (AP) in an infrastructure basic service set. Country information 220, may be used to determine which channels to operate on within that country. Some wireless access points are pre-flashed with country region (e.g., U.S region). This aids in limiting the channels the wireless access point may utilize for communication based on the country of operation. In some aspects, including the Country Information 220 into the Beacon Frame 200B aids users in learning the allowable channels of communication automatically.

Figure 2C:
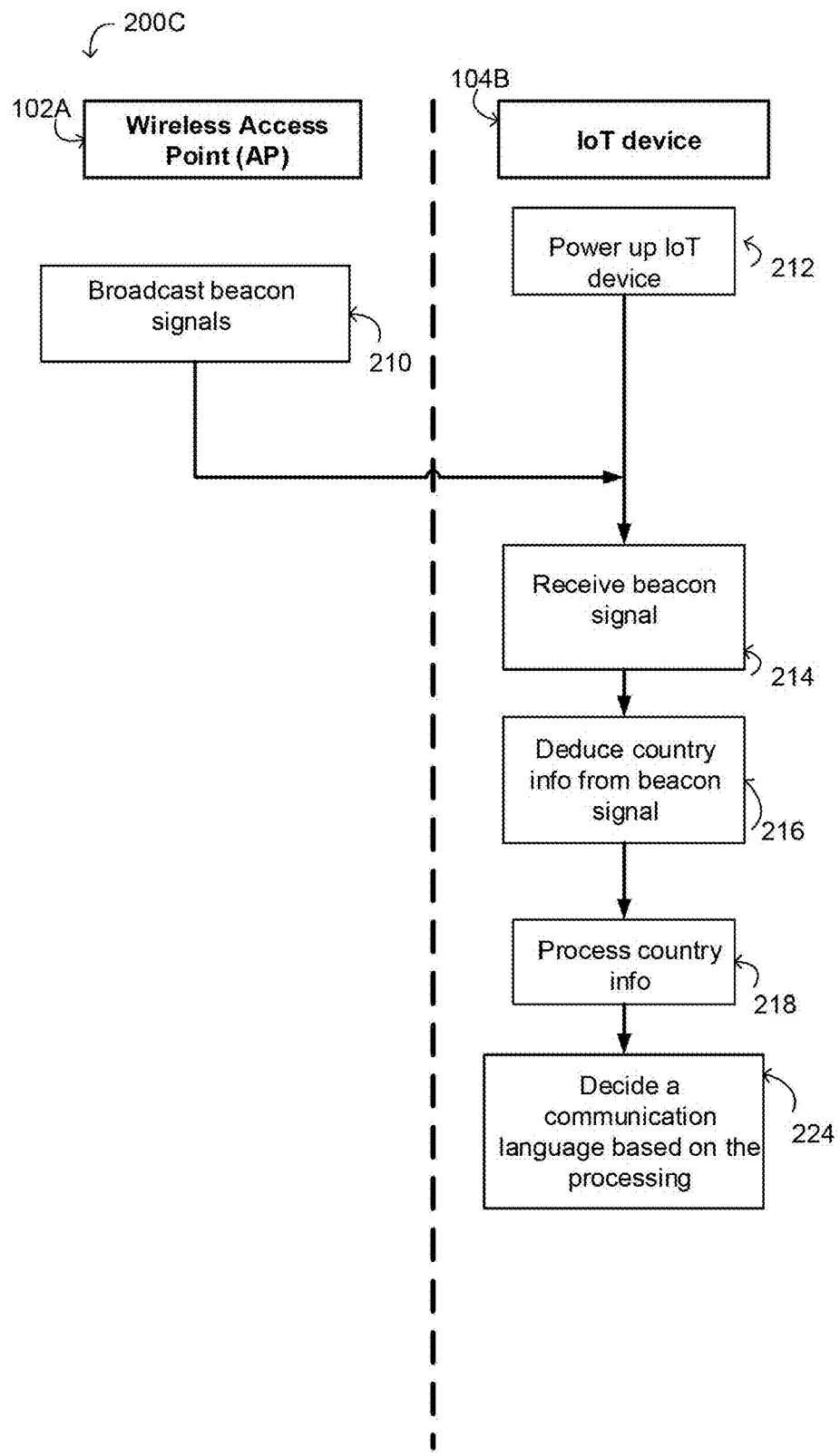
FIG. 2C illustrates an example process for determining a communication language of an IoT device in accordance with one or more embodiments of the present disclosure.

FIG. 2C illustrates an example process 200C for determining a communication language of an IoT device in accordance with one or more embodiments of the present disclosure. For explanatory purposes, the example process 200C is described herein with reference to wireless access point 102A and IoT device 104B of FIG. 1 and FIG. 2A. However, the example process 200C is not limited to wireless access point 102A and IoT device 104B of FIG. 1 and FIG. 2A and the example process 200C may be performed by one or more components of wireless access point 102A and IoT device 104B. Further for explanatory purposes, the blocks of the example process 200C are described herein as occurring in serial, or linearly. However, multiple blocks of the example process 200C may occur in parallel. In addition, the blocks of the example process 200C may be performed a different order than the order shown and/or one or more of the blocks of the example process 200C may not be performed.

Wireless access point 102A broadcasts a message indicating availability for authentication based on network access credentials. The broadcast message may be a beacon signal announcing the presence of the wireless access point 102A and including information about the wireless local area network associated with the wireless access point 102A such as a network identifier (e.g., SSID). In some aspects of the technology, the beacon signal may include country information 220.

In block 210, wireless access point 102A broadcasts a beacon signal to aid in discovering the wireless access point 102A and help devices join the local wireless network associated with wireless access point 102A. In some aspects, IoT device 104B is a new IoT device 104B that needs to be part of the wireless local area network, or IoT device 104B may be an existing IoT device that has lost connection to the wireless local area network (e.g., 202A). Accordingly, a user may initiate the process of adding the IoT device 104B to the network by powering up the IoT device 104B as shown in block 212. Upon powering up the IoT device 104B, the IoT device 104B receives one or more beacon signal from wireless access points within the vicinity of the IoT device 104B as shown in block 214. In block 216, the IoT device 104B deduces the country information 220 from the beacon signal of the one or more received beacon signal. In block 218, the country information 220 is processed by IoT device 104B to determine a country associated with the corresponding wireless access point of the one or more beacon signals. In block 224, a communication language is chosen based on the processed country information of block 218.

In one or more implementations, if the country information 220 of the one or more beacon signals is indicative of a single country, the communication language is assigned as the first official spoken language of the single country. In this scenario, a threshold of 100% is met, where the processed one or more beacons signals indicate a single country. In some aspects of the technology, the country information 220 of the one or more beacon signals is not indicative of a single country, several thresholds are calculated. The thresholds are determined by counting the occurrence of country. For example, by way of illustration only and not by way of limitation, if the one or more beacon signals return a total of two USA countries, one as France and one China. According to aspects of the technology, a first threshold is assigned 50% for English (USA) and second threshold is assigned 25% for Mandarin (China) and third threshold is assigned 25% for French (France), where the first threshold is assigned to the highest occurrence of a country, the second threshold is assigned to the second highest occurrence of a country and so on. In one or more implementations, if the one or more beacon signals have no assigned countries within the beacon frame, a default pre-determined communication language (e.g., English or Mandarin) is set as the default language to use as the communication language of IoT device 104B.

Figure 3:
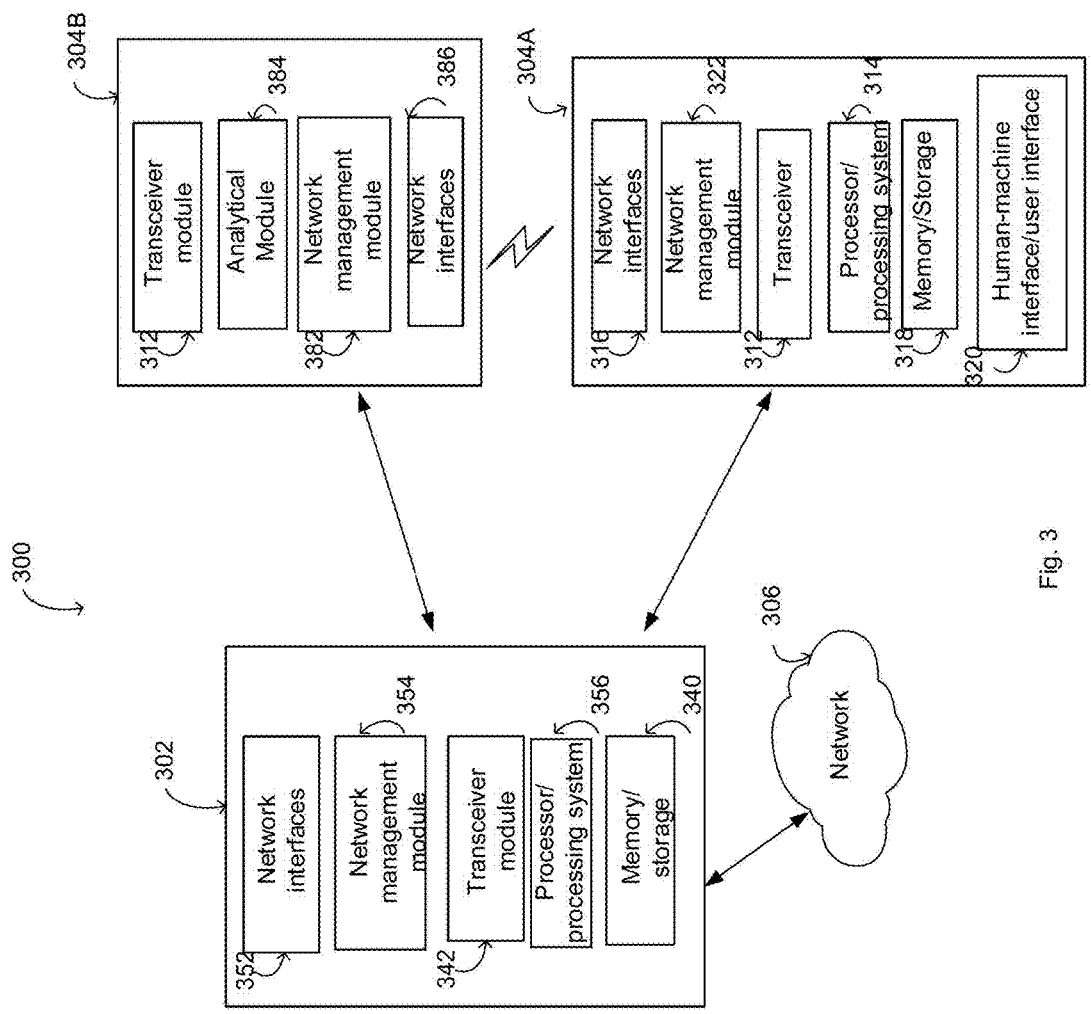
FIG. 3 illustrates an exemplary IoT devices, network wireless access point and wireless user device in accordance with one or more embodiments of the present disclosure.

FIG. 3 illustrates an exemplary IoT devices 304A and 304B, network wireless access point 302 and network 306 similar to the IoT devices 104A and 104B, wireless access point 102A/102B and network 106 of FIG. 2A, respectively, in accordance with one or more embodiments of the present disclosure. Not all of the components depicted in the figure may be used, however, and one or more implementations may include additional components not shown in the figure. Variations in the arrangement and type of the components may be made without departing from the scope of the subject technology. Additional components, different components, or fewer components may be provided.

IoT device 304A, depicted as a wireless user device, includes processor/processing system 314, memory/storage 318, transceiver 312, HMI application 320, network interfaces 316, network management module 322. Memory/storage 318 may include a dynamic random-access memory (DRAM) and/or a read-only memory (ROM). Memory/storage 318 may provide a temporary location to store data and instructions retrieved and processed by processor/processing system 314. Memory/storage 318 may include a non-volatile read-and-write memory that stores data and instructions retrieved and processed by processor/processing system 314. For example, memory/storage 318 may include magnetic, solid state and/or optical media.

Processor/processing system 314 may retrieve and execute instructions from memory/storage 318, in order to perform the processes of the subject disclosure. Processor/processing system 314 can be a single processor, a multi-core processor, or multiple processors in different implementations. HMI application 320 and network management module 322 may include one or more sets of instructions stored in memory/storage 318 that, when executed by processor/processing system 314, cause processor/processing system 314 to perform operations described herein.

HMI application 320 may be configured to receive and authenticate user credentials for a WAP 302, the HMI 320 may receive an SSID and a passphrase from a user. HMI application 320 requests a UDP packets from network management module to be sent to a WAP such as 302 where the UDP packets are programmed to aid in identifying an access point as an access point of interest. In some aspects, HMI application 320 requests a UDP packets from network management module 322 including the authenticating user credentials to be sent to a WAP such as 302 to aid an IoT device 304B in joining the local area wireless network. Network management module 322 manages IoT device 304A device communications with network interfaces 316 and HMI 320. In some aspects, network interface 316 is a machine-interface.

Wireless access point 302 includes processor/processing system 356, transceiver 342, network interface 352, network management module 354 and memory/storage 340. Wireless access point 302 may establish a network connection with IoT device 304A via network interfaces 352. Memory/storage 340 may include a dynamic random-access memory (DRAM) and/or a read-only memory (ROM). Memory/storage 340 may provide a temporary location to store data and instructions retrieved and processed by processor/processing system 356. Memory/storage 340 may include a non-volatile read-and-write memory that stores data and instructions, even when wireless access point 302 is off, that may be retrieved and processed by processor/processing system 356. For example, memory/storage 340 may include magnetic, solid state or optical media.

Processor/processing system 356 may retrieve and execute instructions from Memory/storage 340 in order to perform the processes of the subject disclosure. Processor/processing system 356 can be a single processor, a multi-core processor, or multiple processors in different implementations. Network management module 354 may include one or more sets of instructions stored in Memory/storage 340 that may include instructions that, when executed by processor/processing system 356, cause processor/processing system 356 to perform operations described herein.

Network interface 352 and network management module 354 may be configured to manage the process of associating IoT devices 304A-304B with wireless access point 302. In some aspects, network interface 352 is a machine-interface. For example, network management module 354 may broadcast availability of the wireless access point 302 in a beacon signal and reply to authentication and accessing the wireless local area network requests received from wireless client devices (e.g., IoT devices 104A-104B) according to connection protocols such as the 802.11 protocols and variations described herein. In response to authentication requests from IoT devices 104A-104B, network management module 354 authenticates the network access credentials and, upon authentication, the network management module 354 grants IoT devices 304A and 304B access to WAP 302.

IoT device 304B, depicted as an IoT device to be joined into the WAP 302 network, includes analytical module 384, transceiver module 312, network management module 382 and network interfaces 386. In some aspects, network interface 386 is a machine-interface. Network management module 382 and network interfaces 386 may be configured to manage the discovery of wireless local area networks, identifying an access point within the wireless local area network as an access point of interest. Network management module 382 and network interfaces 386 may be configured to manage the association process between the IoT device 304B and the discovered wireless local area networks.

In some aspects of the technology, analytic module 384 process the beacon frame and extracts the country information 220 from the beacon frame 200B. The analytic module 384 may process the country information 220 to deduce a country associated with the beacon frame 200B. In one or more implementations, analytic module 384 compares the country information 200 (e.g. country code) to a list of country information and associates the country code to a first official language of communication associated to the country code. In some other implementations, a second official language of communication is associated to the country code in addition to the first official language of communication. Upon discovery of a wireless access point that supports and accepts the network access credentials as described herein, the network management module 382 may send a request to join WAP 302 network. Analytical module 384 may include a memory/storage and processor similar to memory/storage 318 and processor/processing system 314 of IoT device 304A. Analytical module 384 utilizes a processor and may retrieve and execute instructions from memory/storage unit within the analytical module 384, in order to perform the processes of the subject disclosure.

Figure 4:
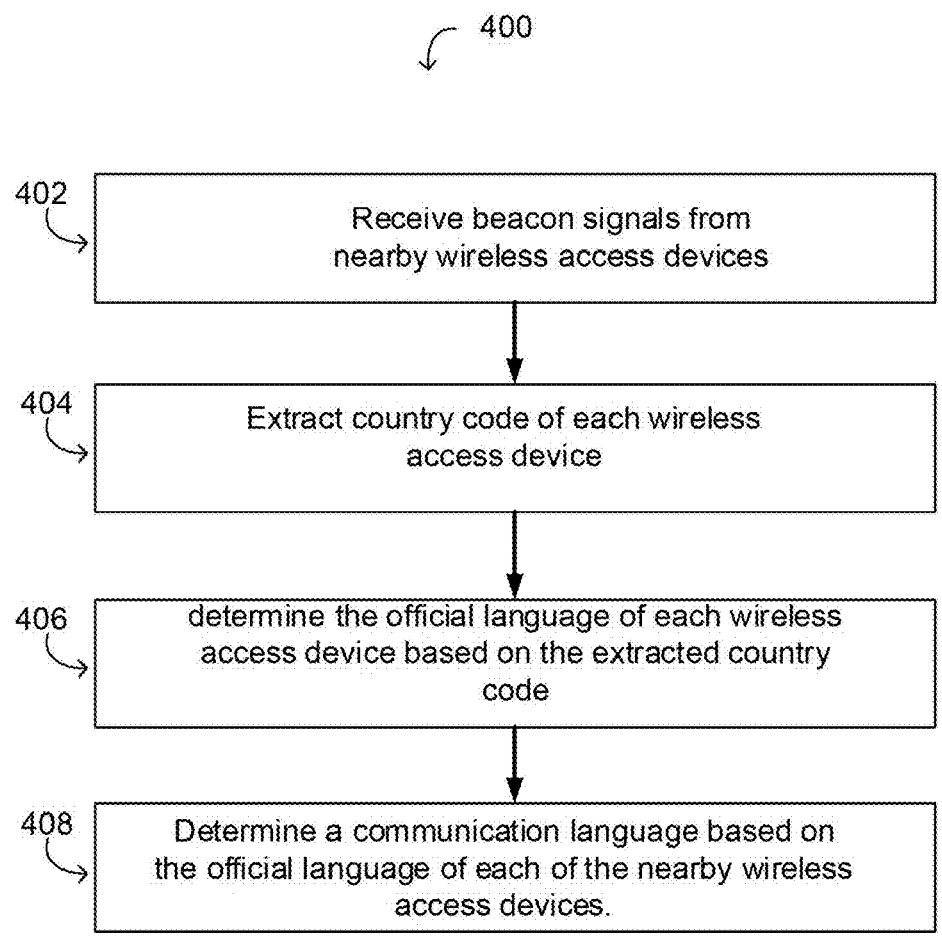
FIG. 4 illustrates an exemplary method to determine a communication language of an IoT device in accordance with one or more embodiments of the present disclosure.

FIG. 4 illustrates an exemplary method 400 to determine a communication language of an IoT device in accordance with one or more embodiments of the present disclosure. For explanatory purposes, the exemplary method 400 is described herein with reference to IoT device 104B and wireless access point 102A of FIG. 1 and FIG. 2A; however, the exemplary method 400 is not limited to IoT device 104B and wireless access point 102A. Further for explanatory purposes, the blocks of the exemplary method 400 are described herein as occurring in serial, or linearly. However, multiple blocks of the exemplary method 400 may occur in parallel. In addition, the blocks of the exemplary method 400 may be performed a different order than the order shown and/or one or more of the blocks of the example process exemplary method 400 may not be performed.

In block 402, an IoT device 104B receives beacon signals broadcast by nearby local access networks via an access point of router. The IoT device 104B extracts country information 220 from the beacon signals of each of the local access networks as shown in block 404. In block 406, based on the extracted country code, the IoT device 104B process the information and determines a first official language spoken by the country and assigns first official language, as depicted in block 408, to be the language of communication of the IoT device 104B. In one or more implementations, the IoT device 104B determines the first official language of communication by looking up the country code from a table of countries. The table of countries may include a list of country codes and a corresponding first official language of communication. In some aspects, each country code may have a second official language option associated to the country code.

In one or more implementations, if the country information 220 of the one or more beacon signals is indicative of a single country, the communication language is assigned as the first official spoken language of the single country. In this scenario, a threshold of 100% is met, where the processed one or more beacons signals indicate a single country. In some aspects of the technology, when the country information 220 of the one or more beacon signals is not indicative of a single country, several thresholds are calculated. The thresholds are determined by counting the occurrence of a country. For example, by way of illustration only and not by way of limitation, if the one or more beacon signals return a total of two occurrences of USA as a country, one occurrence as France and one occurrence as China. According to aspects of the technology, a first threshold is assigned 50% for English (USA) and second threshold is assigned 25% for Mandarin (China) and third threshold is assigned 25% for French (France), where the first threshold is assigned to the highest occurrence of a country (i.e., the first option of language of communication of the IoT device 104B), the second threshold is assigned to the second highest occurrence of a country (i.e., the second option of language of communication of the IoT device 104B) and so on depending on the total number of thresholds. In one or more implementations, if the one or more beacon signals have no assigned countries within the beacon frame, a default pre-determined communication language (e.g., English or Mandarin) is set as the default language to use as the communication language of IoT device 104B.

Figure 5:
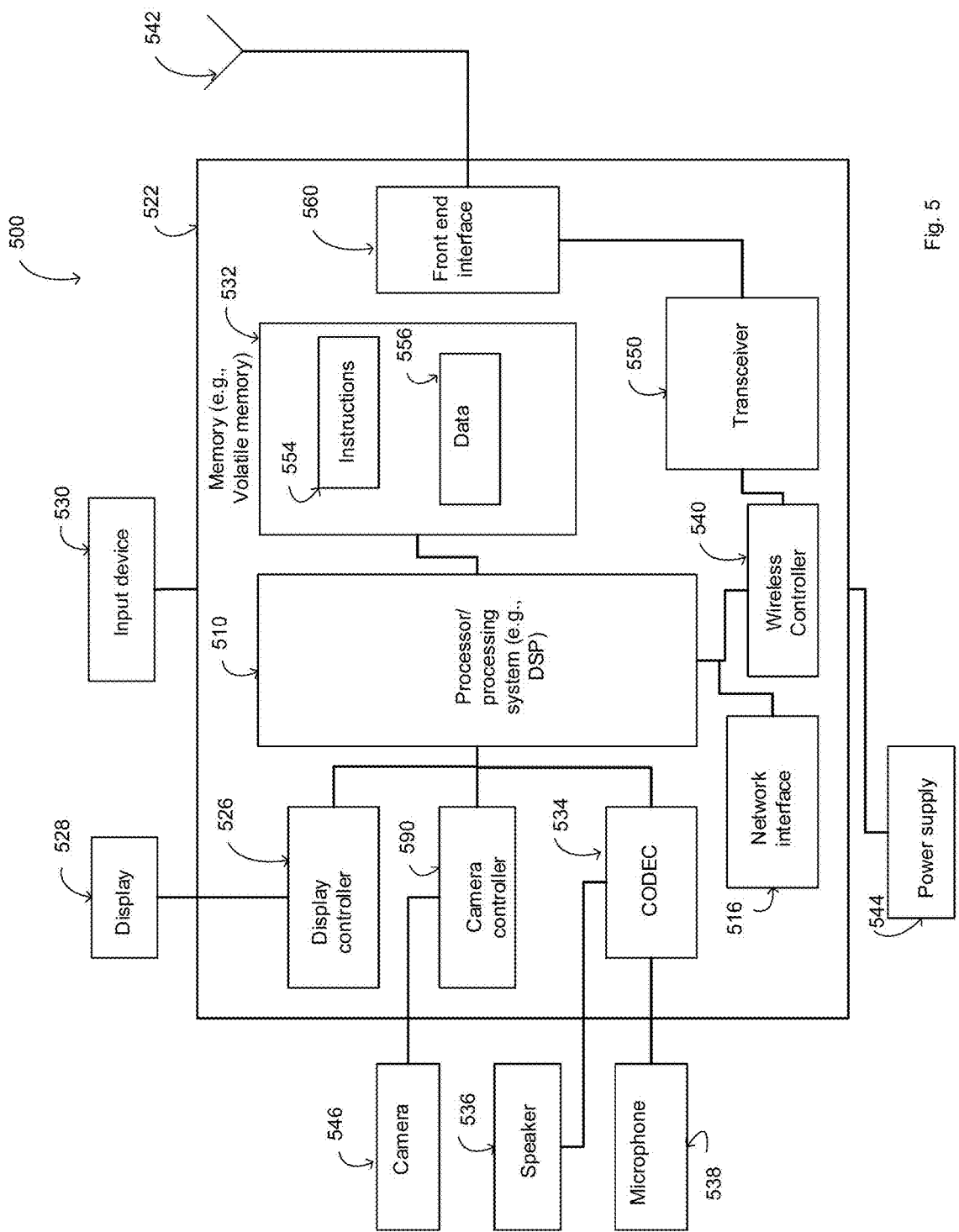
FIG. 5 illustrates conceptually an example electronic system with which some implementations of the present disclosure may be implemented.

FIG. 5 illustrates conceptually an example electronic system 500 with which some implementations of the present disclosure may be implemented. Electronic system 500 may be a gateway device, a set-top box, a computer (e.g., desktop computer or laptop computer), a phone, a personal digital assistant (PDA), a server, a switch, a router, a base station, a receiver, or any other sort of electronic device that transmits signals over a network, such as electronic devices embedded in smart appliances and other smart systems. The electronic system 500 may be, and/or may be a part of, the proxy device and/or one or more of the smart devices. For example, the electronic system 500 may be a sensor, an active device, and/or an actuator. Such an electronic system includes various types of computer readable media and interfaces for various other types of computer readable media.

The electronic system 500 may include a processor 510 such as a processor 314 and processor/processing system 356 and analytical module 384 as depicted in FIG. 3. The processor 510 may be coupled to a computer-readable storage medium, such as a memory 532 (e.g., a non-transitory computer-readable medium), via a transceiver 550. The transceiver 550 may correspond to transceiver 312 and transceiver 342 as depicted in FIG. 3. Moreover, as depicted in FIG. 5, the processor 510 may be external transceiver 550. For example, the processor 510 may be "off-chip" with respect to the transceiver 550. In another embodiment, the processor 510 and the transceiver 550 are integrated within a system-in-package or system-on-chip device 522, as explained further below.

The memory 532 may store instructions 554 that are executable by the processor 510, data 556 that is accessible to the processor 510, or a combination thereof. In a particular embodiment, the memory 532 is a volatile memory that is accessible to the processor via transceiver 550. FIG. 5 also shows a display controller 526 that is coupled to the processor 510 and to a display 528. A coder/decoder (CODEC) 534 may also be coupled to the processor 510. A speaker 536 and a microphone 538 may be coupled to the CODEC 534. FIG. 5 also indicates that a wireless controller 540 may be coupled to the processor 510. The wireless controller may be further coupled to an antenna 542 via a transceiver 550. A camera 546 may be coupled to a camera controller 590. The camera controller 590 may be coupled to the processor 510.

In a particular embodiment, the processor 510, the memory 532, the display controller 526, the camera controller 590, the CODEC 534, the wireless controller 540, and the transceiver 550 are included in the system-in-package or system-on-chip device 522. An input device 530 and a power supply 544 may be coupled to the system-on-chip device 522. Moreover, in a particular embodiment, and as illustrated in FIG. 5, the display 528, the input device 530, the camera 546, the speaker 536, the microphone 538, the antenna 542, and the power supply 544 are external to the system-on-chip device 522. However, each of the display 528, the input device 530, the camera 546, the speaker 536, the microphone 538, the antenna 542, and the power supply 544 may be coupled to a component of the system-on-chip device 522. As a particular example, the processor 510 and the memory 532 are coupled to transceiver 550.

In connection with the present disclosure, a computer-readable storage medium (e.g., the memory 532) stores data (e.g., the data 556) that is accessible to a processor (e.g., the processor 510) during modes of operation of transceiver 550. The data 556 may be a method instruction as depicted in FIG. 4. The method instructions are executable by processor 510, where the instructions include steps on how to operate and configure the transceiver 550. Finally, as depicted in FIG. 5, electronic system 500 couples to a network through a network interface 516. In this manner, the electronic system 500 may be a part of a network of computers (for example, a local area network (LAN), a wide area network (WAN), or an Intranet, or a network of networks, for example, the Internet. Any or all components of electronic system 500 may be used in conjunction with the subject disclosure. The network interface 516 may include cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication.

Those of skill in the art will appreciate that the foregoing disclosed systems and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the electronic system 500, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A device comprising:
 a network module; the network module capable of communicatively coupling to one or more network access points;
 one or more processors;

a machine-readable medium comprising instructions stored therein, which, when executed by the one or more processors cause the one or more processors to perform operations comprising:

receiving one or more broadcast signals from the one or more network access points, wherein the broadcast signal comprises a network discovery beacon frame;

extracting an information from the beacon frame of each broadcast signal;

determining a language of communication based on the extracted information; and assigning the language of communication as a first option of language of communication of the device, wherein determining the first option of language of communication comprises meeting a first calculated threshold; and communicating voice messages utilizing the first option of language of communication, wherein failure to receive a response to the communicating within a predetermined period of time utilizing the first option of language of communication results in assigning a second option of language of communication as the language of communication of the device.

2. The device of claim 1, wherein the information is country information within the beacon frame, and wherein when the information contains no country information, the language of communication is assigned to a default predetermined language of communication.

3. The device of claim 1, wherein failure to meet the first calculated threshold and meeting a second calculated threshold results in assigning the second option of language of communication as the language of communication of the device.

4. The device of claim 3, wherein failure to meet the first calculated threshold, failure to meet the second calculated threshold and meeting a third calculated threshold results in assigning a third option of language of communication as the language of communication of the device.

5. The device of claim 4, wherein failure to respond to communicating within a predetermined period of time utilizing the second option of language of communication results in assigning the third option of language of communication as the language of communication of the device.

6. The device of claim 5, wherein the first calculated threshold, the second calculated threshold and the third calculated threshold are determined from the information and the number of one or more network access points.

7. A method comprising:
receiving one or more broadcast signals, from one or more network access points, wherein the broadcast signal comprises a network discovery beacon frame;

extracting an information from the beacon frame of each broadcast signal;

determining a language of communication based on the extracted information; and assigning the language of communication as a first option of language of communication of a device, wherein determining the first option of language of communication comprises meeting a first calculated threshold; and communicating voice messages utilizing the first option of language of communication, wherein failure to receive a response to the communicating within a predetermined period of time utilizing the first option of language of communication results in assigning a second option of language of communication as the language of communication of the device.

8. The method of claim 7, wherein the information is country information within the beacon frame, and wherein when the information contains no country information the language of communication is assigned to a default predetermined language of communication.

9. The method of claim 7, wherein failure to meet the first calculated threshold and meeting a second calculated threshold results in assigning the second option of language of communication as the language of communication of the device.

10. The method of claim 9, wherein failure to meet the first calculated threshold, failure to meet the second calculated threshold and meeting a third calculated threshold results in assigning a third option of language of communication as the language of communication of the device.

11. The method of claim 10, wherein failure to respond to a communication within a predetermined period of time utilizing the second option of language of communication results in assigning the third option of language of communication as the language of communication of the device.

12. The method of claim 11, wherein the first calculated threshold, the second calculated threshold and the third calculated threshold are determined from the information and the number of one or more network access points.

13. A non-transitory machine-readable medium comprising instructions stored therein, which, when executed by one or more processors of a processing system cause the one or more processors to perform operations comprising:

receiving one or more broadcast signals from one or more network access points, wherein the broadcast signal comprises a network discovery beacon frame;

extracting an information from the beacon frame of each broadcast signal;

determining a language of communication based on the extracted information; and assigning the language of communication as a first option of language of communication of a device, wherein determining the first option of language of communication comprises meeting a first calculated threshold; and communicating voice messages utilizing the first option of language of communication, wherein failure to receive a response to the communicating within a predetermined period of time utilizing the first option of language of communication results in assigning a second option of language of communication as the language of communication of the device.

14. The non-transitory machine-readable medium of claim 13, wherein the information is country information within the beacon frame, and wherein when the information contains no country information the language of communication is assigned to a default predetermined language of communication.

15. The non-transitory machine-readable medium of claim 14, wherein failure to meet the first calculated threshold and meeting a second calculated threshold results in assigning the second option of language of communication as the language of communication of the device.

16. The non-transitory machine-readable, medium of claim 15, wherein failure to meet the first calculated threshold, failure to meet the second calculated threshold and meeting a third calculated threshold results in assigning a third option of language of communication as the language of communication of the device.

17. The non-transitory machine-readable medium of claim 16, wherein failure to respond to a communication within a predetermined period of time utilizing the second option of language of communication results in assigning the third option of language of communication as the language of communication of the device.

18. The non-transitory machine-readable medium of claim 17, wherein the first calculated threshold, the second calculated threshold and the third calculated threshold are determined from the information and the number of one or more network access points.

19. The non-transitory machine-readable medium of claim 18, wherein failure to respond to a communication within a predetermined period of time of utilizing the third option of language of communication results in assigning a default predetermined language of communication.

20. The non-transitory machine-readable medium of claim 19, wherein the first option of language of communication, the second option of language of communication or the third option of language of communication is a first official language of communication associated with the country information of a corresponding network access point.

21. The non-transitory machine-readable medium of claim 20, wherein failure to respond to a communication within a predetermined period of time of utilizing first official language of communication results in assigning the first option of language of communication a second official language of communication associated with the country information.

* * * * *